(12) United States Patent
Teufel et al.

(10) Patent No.: US 11,489,382 B2
(45) Date of Patent: Nov. 1, 2022

(54) ROTOR HAVING CAST MAGNETIC ELEMENTS WITH PROJECTIONS

(71) Applicant: BRUSA Elektronik AG, Sennwald (CH)

(72) Inventors: Raphael Teufel, Empfingen (DE); Tian Zhou, Lucerne (CH); Daniel Oeschger, St. Gallen (CH)

(73) Assignee: BRUSA Elektronik AG, Sennwald (CH)

( * ) Notice: Subject to any disclaimer, the term of this patent is extended or adjusted under 35 U.S.C. 154(b) by 183 days.

(21) Appl. No.: 16/818,626

(22) Filed: Mar. 13, 2020

(65) Prior Publication Data
US 2020/0303977 A1 Sep. 24, 2020

(30) Foreign Application Priority Data
Mar. 22, 2019 (DE) ...................... 10 2019 107 394.4

(51) Int. Cl.
*H02K 1/27* (2022.01)
*H02K 1/276* (2022.01)

(52) U.S. Cl.
CPC .................................. *H02K 1/276* (2013.01)

(58) Field of Classification Search
CPC ... H02K 1/276; H02K 2213/03; H02K 1/2766
See application file for complete search history.

(56) References Cited

U.S. PATENT DOCUMENTS

| 6,630,762 B2 * | 10/2003 | Naito | H02K 1/2766 |
| | | | 310/156.53 |
| 2014/0175932 A1 * | 6/2014 | Huang | H02K 1/246 |
| | | | 310/156.38 |
| 2019/0207490 A1 * | 7/2019 | Ghoul | H02K 1/246 |

FOREIGN PATENT DOCUMENTS

| DE | 102016214542 A1 | 2/2018 |
| JP | 2000-197320 A | 7/2000 |

* cited by examiner

*Primary Examiner* — Thomas Truong
(74) *Attorney, Agent, or Firm* — Hoffmann & Baron, LLP

(57) ABSTRACT

The invention relates to a rotor for a synchronous drive motor including a plurality of rotor poles, each rotor pole having at least two magnetic layers arranged radially one behind the other, and each magnetic layer comprising a series of magnetic elements, which are formed by injection molding or casting, and solidification of permanent magnetic material in rotor cavities. According to the invention, at least a portion of the magnetic elements each include projections protruding on both sides in their radially inner halves to introduce centrifugal forces of the magnetic elements into the rotor. This ensures an improved possibility of supporting the magnetic elements where sufficient rotor material is available. As a result, it is possible to prevent the radially outer ends of the magnetic elements from abutting the wall of the rotor as a result of centrifugal forces, which reduces the loads and deformations in the webs and bridges between the magnetic elements or to the outer edge of the rotor.

31 Claims, 2 Drawing Sheets

ROTOR HAVING CAST MAGNETIC ELEMENTS WITH PROJECTIONS

CROSS-REFERENCE TO RELATED APPLICATIONS

The present application claims priority to German Patent Application No. 10 2019 107 394.4, filed on 22 Mar. 2019, the entire contents of which are incorporated herein by reference.

BACKGROUND

Field

The invention relates to a rotor for a synchronous drive motor including a plurality of rotor poles, each rotor pole having at least two magnetic layers arranged radially one behind the other, and each magnetic layer comprising a series of magnetic elements which are formed by injection molding or casting and by solidification of permanent magnetic material in rotor cavities. The invention further relates to a synchronous drive motor provided with such a rotor and to a motor vehicle provided with such a drive motor.

Related Art

Synchronous drive motors are widely used as drive machines for electric vehicles because they have a high torque and thus a high power density over the entire speed range and ensure high driving dynamics of the motor-powered vehicle at low weight. Such engines, in particular, have high Esson utilization rates, so that a high cost-performance ratio may be achieved.

The torque in hybrid synchronous motors (HSM) is composed of two components, namely the reluctance torque and the synchronous torque, wherein it is desirable to increase the proportion of the reluctance torque relative to the total torque as much as possible, ideally 50% or higher.

The rotors of synchronous drive motors include multiple poles, with each pole being assigned buried magnetic layers, which are arranged essentially in a U-shape symmetrically around the pole center axes (namely d-axis), and which are made up of a series of cavities in which permanent magnets are arranged.

Such a rotor is known from JP 2000197320A, in which the magnetic layers are formed by a flowable plastic matrix having embedded magnetizable magnetic particles, the heated substance being injected into the cavities formed in the rotor by an injection molding process, with the uniform alignment of the magnets being achieved by a strong external magnetic field during the injection process.

One problem in this case is that the injected magnetic material shrinks more than the surroundings of the cavity due to the higher coefficient of thermal expansion during the cooling process and then remains in the cavity with some play in the cooled state.

During operation, the magnet thus produced is subjected to a very high centrifugal force, as a result of which, due to the play, an increased pressure load acts on the radially outer edge of the cavity. In the case of the radially outer magnets, in particular, it is desirable, in order to align the magnetic currents and to minimize short-circuit currents, to leave only a relatively narrow web to the outer edge of the rotor, which would then result in undesirable loads and deformations in such webs.

SUMMARY

The object of the invention is to provide a geometry for magnetic elements of a rotor that enables the centrifugal forces to be absorbed as effectively as possible.

The invention results from the features of the independent claims. Advantageous further refinements and embodiments are the subject of the dependent claims. Further features, potential applications and advantages of the invention result from the following description and from the explanation of example embodiments of the invention, which are shown in the figures.

The object is achieved according to claim 1 in that at least a portion of the magnetic elements each have projections protruding on both sides in their radially inner halves for introducing the centrifugal forces of the magnetic elements into the rotor.

The design according to the invention ensures a possibility of support in the radially inner region of the magnetic element, where sufficient rotor material is available to enable problem-free support. This makes it possible to either completely prevent the radially outer end of a magnetic element from abutting the cavity wall, which is important, in particular, for the radially outer magnetic elements, or to significantly reduce the compressive forces as compared to a conventional magnetic element, which reduces the loads and deformations in the webs and bridges between the magnetic elements or to the outer edge of the rotor.

According to one advantageous refinement of the invention, two further projections protruding on both sides are formed in the outer half of magnetic elements having a length/width ratio of more than 3:1. This design is advantageous in such elongated magnetic elements due to the greater centrifugal force-induced change in length, in particular, when the longitudinal axes of such magnetic elements are oriented more radially, and therefore the tendency to pressurize the radially outer cavity wall via the magnetic element is particularly high.

According to one advantageous refinement of the invention, all the magnetic elements of the second and third magnetic layers, as viewed from radially outside, are designed in such a way. In the radially outermost magnetic layer, the magnetic elements are oriented relatively tangentially, so that the cavity wall is only pressurized to a small extent. In the second and even more so in the third magnetic layer, the magnetic elements located at the edge, in particular, are oriented more or less radially, so that the support arrangement according to the invention is effective.

According to one alternative advantageous refinement of the invention, only the radially outer magnetic elements of a magnetic layer are designed in such a way, because, as mentioned above, they have an essentially radially aligned longitudinal axis and the centrifugal forces therefore have a greater impact.

According to one alternative advantageous refinement of the invention, the projections have support surfaces for supporting the centrifugal force on the rotor, the surface tangents of which have an angle of 30° to 80°, preferably 40° to 60°, relative to the direction of extension of the magnetic elements. In this case, the direction of extension itself would be 0°. Thus, on the one hand, the magnetic element is displaced counter to the radial direction, i.e., to the center of the rotor during the cooling process and accompanying shrinkage process, which increases the gap between the magnetic element and the cavity wall in the area of the radial end. In addition, a centering and thus stabilizing effect on the magnetic element is achieved as a result of the centrifugal forces.

According to one advantageous refinement of the invention, the maximum extension of each of the projections normal relative to the direction of extension of the magnetic elements is less than 50% of the width of the magnetic elements at this point. This limitation serves to not block too much of the reluctance flow path, since in this type of synchronous machines, large parts of the torque are produced via the reluctance effect.

According to one advantageous refinement of the invention, opposite projections of adjacent magnetic elements of different magnetic layers are laterally offset from one another in such a way that the shortest distance from one projection to the nearest projection of the adjacent magnetic element is not less than the shortest distance of the projection to the side edge of the adjacent magnetic element. This advantageously ensures that the material thickness of the rotor material between adjacent magnetic layers remains largely constant and magnetically saturated areas are thereby avoided.

According to one advantageous refinement of the invention, end faces of magnetic elements, which lie opposite adjacent magnetic elements in the same magnetic layer and thus form bridges between opposite end faces of adjacent magnetic elements, are shaped essentially flat and parallel to one another, at least in a section of 50%, in such a way that the bridges have a constant cross section over at least half the extension. According to one advantageous refinement of this design, the width of the bridge in this section changes by no more than 20%.

In this way, bridges having a largely constant cross section are achieved, which serves to minimize magnetic losses.

According to one advantageous refinement of the invention, the projections are each arranged at the radially inner end of the magnetic elements and the rear sides of which also form and broaden the radially inner end surface of the respective magnetic element. In this way, bridges of greater extension having a largely constant width are achieved, which has the advantage that the harmful so-called leakage flux has a further path, as a result of which less magnetic force becomes leakage flux, and that torque is thus produced instead of increasing the torque ripple which it influences.

The invention further comprises a synchronous drive motor including a rotor according to one of the above-described designs or refinements.

Further advantages, features and details result from the following description, in which—if necessary with reference to the drawings—at least one example embodiment is described in detail. Identical, similar, and/or functionally identical parts are provided with the same reference numerals.

DETAILED DESCRIPTION

Figure 1:
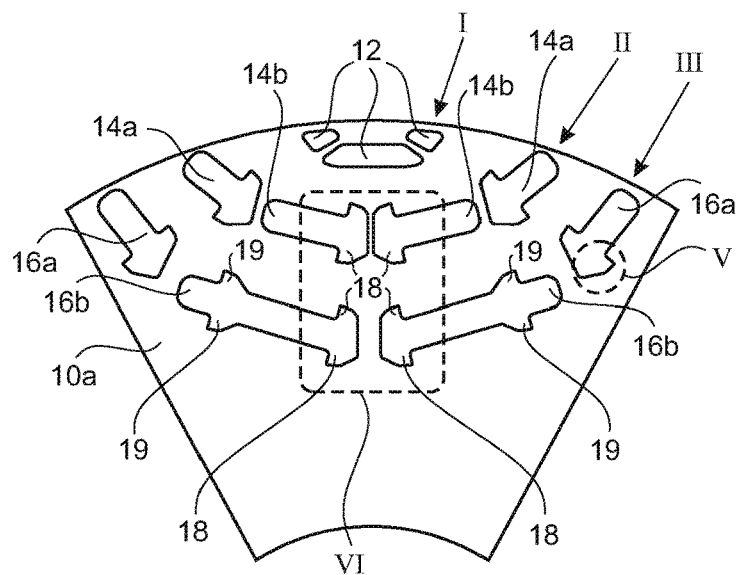
FIG. 1 shows a schematic illustration of a rotor sector according to a first embodiment of the invention.
Figure 2:
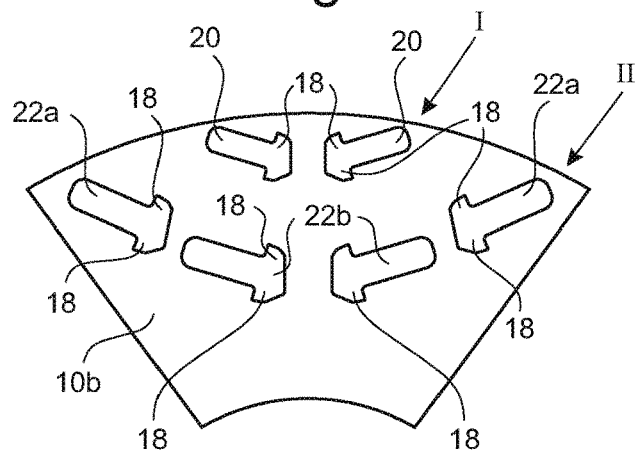
FIG. 2 shows a schematic illustration of a rotor sector according to a second embodiment of the invention.
Figure 3:
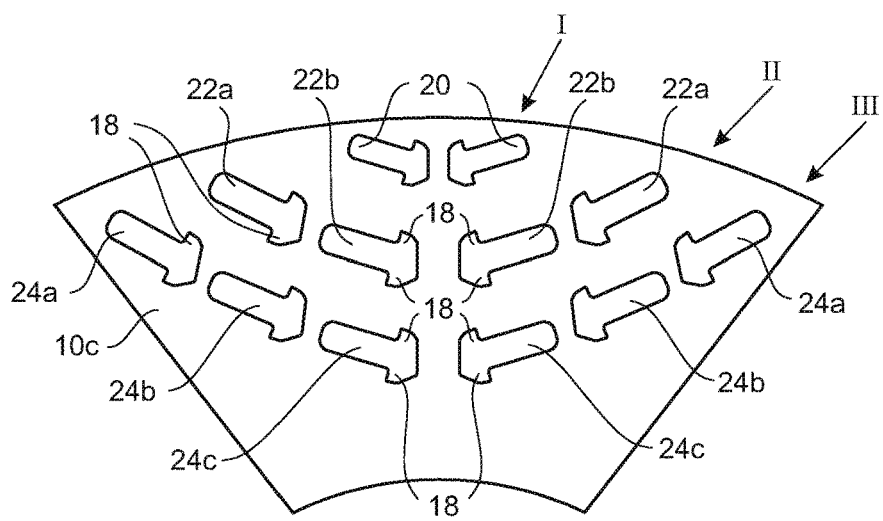
FIG. 3 shows a schematic illustration of a rotor sector according to a third embodiment of the invention.

FIGS. 1 through 3 show three embodiments of sector-like parts of rotors 10*a*, 10*b*, and 10*c*, each symmetrical with respect to a radial pole axis. A rotor 10*a*, 10*b*, or 10*c* normally has six to ten poles, which are evenly distributed over the circumference. A stator (not shown) having the same number of poles is situated in each case radially outside the rotor 10*a*, 10*b*, or 10*c*.

Each pole of a rotor 10*a*, 10*b*, or 10*c* includes multiple magnetic layers, each made up of a series of magnetic elements. The embodiment according to FIG. 1 includes three magnetic layers I, II, and III. The first magnetic layer I is made up of three magnetic elements 12, which have a conventional design. The magnetic elements 14*a* and 14*b* of the second magnetic layer II have the configuration according to the invention. In the same way, the magnetic elements 16*a* and 16*b* of the third magnetic layer III have the configuration according to the invention. It should be mentioned in this context that within the scope of the invention, not all magnetic elements 14*a*, 14*b*, 16*a*, and 16*b* of the two magnetic layers II and III must have such a configuration, however. A conventional design may be used, in particular, for the inner magnetic elements 14*b* and 16*b*, which have a more tangential orientation.

The magnetic elements 14*a*, 14*b*, 16*a*, and 16*b* are formed by injection molding or casting, and solidification of permanent magnetic material in correspondingly shaped rotor cavities. The magnetic elements 14*a*, 14*b*, 16*a*, and 16*b* each include projections 18 which protrude on both sides in their radially inner halves. The projections 18 in the radially outer magnetic elements 14*a* and 16*a* are situated in the radially inner part of the magnetic elements 14*a* and 16*a*.

FIG. 1 shows a further embodiment of magnetic elements 16*b* in the third magnetic layer III, which have a length/width ratio of more than 3:1 (without accounting for the broadening caused by the projections 18), and two further projections 19 projecting on both sides being formed in the radially outer half. This ensures a less stressful introduction of the centrifugal forces of the magnetic elements 16*b* into the rotor 10*a*, because the introduction of force is distributed among four projections 18 and 19.

The embodiment according to FIG. 2 includes only two magnetic layers I and II, with all the magnetic elements 20 of the outer magnetic layer I and all the magnetic elements 22*a* and 22*b* of the inner magnetic layer II having the design according to the invention with projections 18 on both sides.

The embodiment according to FIG. 3 in turn includes three magnetic layers I, II, and III, with all magnetic elements 20, 22*a*, 22*b*, 24*a*, and 24*b* of all magnetic layers having the design according to the invention with projections 18 on both sides. In FIGS. 2 and 3, the magnetic elements 22*a*, 22*b*, 24*a*, and 24*b* of the second and third magnetic layers II and III are arranged in a straight line one behind the other. Alternatively, it is of course possible within the scope of the invention to design the magnetic layers in a curvilinear manner as in FIG. 1.

Figure 4:
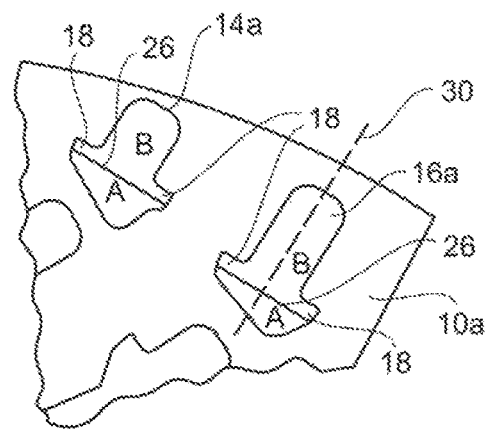
FIG. 4 shows detail of the first embodiment according to FIG. 1.

FIG. 4 shows that the magnetic elements 14*a* and 16*a* have the respective projections 18 in the area of the radially inner half, i.e., the areas A situated behind the respective connecting line 26 of the widest extension of the projections are smaller than the areas B in front of the connecting line 26 relative to the direction of extension 30 of the magnetic elements 14a and 16a. As a result, the magnetic elements 14a and 16a are supported relatively far radially inward, which reduces the mechanical loads in the radially outer area.

Figure 5:
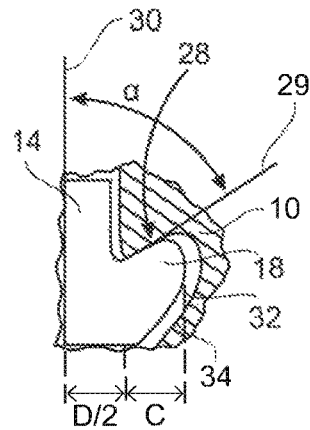
FIG. 5 shows detail identified by reference V in FIG. 1.

FIG. 5 shows detail identified by reference V in FIG. 1. In one preferred embodiment of the invention, according to which the projections 18 of the magnetic elements 14 (representative of magnetic elements 14a, 14b 16a, 16b, 20, 22a, 22b, 24a, 24b, and 24c) include support surfaces 28 for centrifugal force support on a rotor 10 (representative of rotors 10a, 10b, and 10c), the surface tangents 29 of which have an angle α of between 30° and 80° relative to the direction of extension 30 of the magnetic elements 14. As a result, during the cooling process and the accompanying shrinkage process, the magnetic element is displaced counter to the radial direction, i.e., to the center of the rotor 10, which increases a gap 32 between the magnetic element 14 and the cavity wall 34 in the area of the radial end. In addition, a centering and thus stabilizing effect on the magnetic element is achieved as a result of the centrifugal forces. FIG. 5 also shows a greatly enlarged gap 32 between the cavity wall 34 and the magnetic element 14, which is formed by the shrinking process of the magnetic element 14. The maximum extension C of each of the projections 18 perpendicular to the direction of extension 30 of the magnetic elements 14 is less than 50% of the width D of the magnetic elements 14 at this point (D/2 is shown in FIG. 5).

Figure 6:
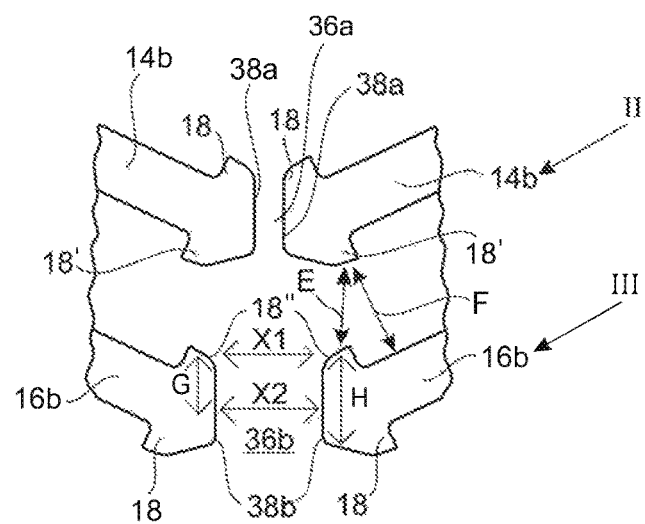
FIG. 6 shows detail identified by reference VI in FIG. 1.

FIG. 6 shows detail identified by reference VI in FIG. 1. Two pairs of adjacent magnetic elements 14b and 16b are shown, and between each of the pairs respective bridges 36a and 36b are defined by end surfaces 38a and 38b of the magnetic elements 14b and 16b. In this case, opposing end surfaces 38a and 38b of adjacent pairs of magnetic elements 14b and 16b, at least in a section of 50%, are designed essentially flat and approximately parallel to one another, which means that the bridges 36a and 36b have an approximately constant cross-section or a constant width over at least half the extension or length. In other words, the ratio of the smallest width X2 to the largest width X1 within the bridge 36b is less than 1.2 (X1/X2<1.2) over a length section G which has at least half the total length H, i.e., the width of the bridge 36b in this section changes by not more than 20%. The magnetic losses are reduced by these bridges 36a and 36b that have a relatively constant width.

The projections 18 in the magnetic elements 14b and 16b are each arranged at the radially inner end of these magnetic elements 14b and 16b. As a result, their respective rear sides also form the radially inner end surfaces 38a and 38b of the respective magnetic elements 14b and 16b, and thus lengthen the respective bridges 36a and 36b.

A preferred refinement of the invention is shown in FIG. 6. Opposing projections 18' and 18" of adjacent magnetic elements 14b and 16b of the different magnetic layers II and III are laterally offset in this case from one another in such a way that the shortest distance E from a projection 18' of the magnetic element 14b to the nearest projection 18" of the adjacent magnetic element 16b is not less than the shortest distance F of the projection 18' of the magnetic element 14b to the side edge of the adjacent magnetic element 16b. This avoids constrictions between radially adjacent magnetic elements 14b and 16b, and thus magnetically saturated zones.

Although the invention has been illustrated and explained in greater detail using preferred example embodiments, the invention is not limited by the disclosed examples and other variations may be derived therefrom by a person skilled in the art without departing from the scope of protection of the invention. It is therefore clear that there is a variety of possible variations. It is also clear that embodiments cited by way of example actually only constitute examples that are not to be interpreted in any way as a limitation of the scope, of the potential applications or of the configuration of the invention. Instead, the preceding description and the description of the figures enable the person skilled in the art to specifically implement the example embodiments, the person skilled in the art having knowledge of the disclosed inventive concept being able to make numerous changes, for example, with respect to the function or the arrangement of individual elements cited in an example embodiment, without departing from the scope of protection, which is defined by the claims and their legal equivalents, such as a further explanation in the description.

LIST OF REFERENCE NUMERALS 10a, 10b, 10c rotors
12 magnetic elements
14a, 14b magnetic elements
16a, 16b magnetic elements
18, 18', 18" projection
19 projection
20 magnetic elements
22a, 22b magnetic elements
24a, 24b magnetic elements
26 connecting lines
28 support surface
29 surface tangent
30 direction of extension
32 gap
34 cavity wall
36a, 36b bridges
38a, 38b end faces

The invention claimed is:

1. A rotor for a synchronous drive motor, the rotor having a plurality of rotor poles, each rotor pole having at least two radially arranged magnetic layers, and each magnetic layer comprising a number of magnetic elements, the magnetic elements formed by injection molding or casting, and solidification of permanent magnetic material in rotor cavities, wherein at least a portion of the magnetic elements each have in their radially inner halves projections protruding on both sides to introduce centrifugal forces of the magnetic elements into the rotor, wherein the projections have support surfaces for centrifugal force support on the rotor, the support surfaces defining surface tangents at an angle α of 30° to 80° relative to a direction of extension of the magnetic elements.

2. The rotor according to claim 1, wherein further projections protruding on both sides are formed in radially outer halves of at least a portion of the magnetic elements, the magnetic elements having a length/width ratio of more than 3:1.

3. The rotor according to claim 1, wherein all magnetic elements of a second magnetic layer and a third magnetic layer as viewed from radially outside are formed substantially the same.

4. The rotor according to claim 1, wherein respective radially outer magnetic elements of a magnetic layer are formed substantially the same.

5. The rotor according to claim 1, wherein the angle α is 40° to 60° relative to the direction of extension of the magnetic elements.

6. A synchronous drive motor comprising the rotor according to claim 1.

7. A motor vehicle comprising the synchronous drive motor according to claim 6.

8. A rotor for a synchronous drive motor, the rotor having a plurality of rotor poles, each rotor pole having at least two radially arranged magnetic layers, and each magnetic layer comprising a number of magnetic elements, the magnetic elements formed by injection molding or casting, and solidification of permanent magnetic material in rotor cavities, wherein at least a portion of the magnetic elements each have in their radially inner halves projections protruding on both sides to introduce centrifugal forces of the magnetic elements into the rotor, wherein a maximum extension (C) of each of the projections normal relative to a direction of extension of the magnetic elements is less than 50% of a width (D) of the magnetic elements.

9. The rotor according to claim 8, wherein further projections protruding on both sides are formed in radially outer halves of at least a portion of the magnetic elements, the magnetic elements having a length/width ratio of more than 3:1.

10. The rotor according to claim 8, wherein all magnetic elements of a second magnetic layer and a third magnetic layer as viewed from radially outside are formed substantially the same.

11. The rotor according to claim 8, wherein respective radially outer magnetic elements of a magnetic layer are formed substantially the same.

12. A synchronous drive motor comprising the rotor according to claim 8.

13. A motor vehicle comprising the synchronous drive motor according to claim 12.

14. A rotor for a synchronous drive motor, the rotor having a plurality of rotor poles, each rotor pole having at least two radially arranged magnetic layers, and each magnetic layer comprising a number of magnetic elements, the magnetic elements formed by injection molding or casting, and solidification of permanent magnetic material in rotor cavities, wherein at least a portion of the magnetic elements each have in their radially inner halves projections protruding on both sides to introduce centrifugal forces of the magnetic elements into the rotor, wherein opposite projections of adjacent magnetic elements of different magnetic layers are laterally offset from one another in such a way that a shortest distance (E) from a first projection of a first magnetic element to a nearest second projection of an adjacent magnetic element is not less than a shortest distance (F) of the first projection to the side edge of the adjacent magnetic element.

15. The rotor according to claim 14, wherein further projections protruding on both sides are formed in radially outer halves of at least a portion of the magnetic elements, the magnetic elements having a length/width ratio of more than 3:1.

16. The rotor according to claim 14, wherein all magnetic elements of a second magnetic layer and a third magnetic layer as viewed from radially outside are formed substantially the same.

17. The rotor according to claim 14, wherein respective radially outer magnetic elements of a magnetic layer are formed substantially the same.

18. A synchronous drive motor comprising the rotor according to claim 14.

19. A motor vehicle comprising the synchronous drive motor according to claim 18.

20. A rotor for a synchronous drive motor, the rotor having a plurality of rotor poles, each rotor pole having at least two radially arranged magnetic layers, and each magnetic layer comprising a number of magnetic elements, the magnetic elements formed by injection molding or casting, and solidification of permanent magnetic material in rotor cavities, wherein at least a portion of the magnetic elements each have in their radially inner halves projections protruding on both sides to introduce centrifugal forces of the magnetic elements into the rotor, wherein further projections protruding on both sides are formed in radially outer halves of at least a portion of the magnetic elements, the magnetic elements having a length/width ratio of more than 3:1, wherein the further projections have support surfaces for centrifugal force support on the rotor, the support surfaces defining surface tangents at an angle α of 30° to 80° relative to a direction of extension of the magnetic elements.

21. The rotor according to claim 20, wherein the angle α is 40° to 60° relative to the direction of extension of the magnetic elements.

22. The rotor according to claim 20, wherein a maximum extension (C) of each of the further projections normal relative to a direction of extension of the magnetic elements is less than 50% of a width (D) of the magnetic elements.

23. A synchronous drive motor comprising the rotor according to claim 20.

24. A motor vehicle comprising the synchronous drive motor according to claim 23.

25. A rotor for a synchronous drive motor, the rotor having a plurality of rotor poles, each rotor pole having at least two radially arranged magnetic layers, and each magnetic layer comprising a number of magnetic elements, the magnetic elements formed by injection molding or casting, and solidification of permanent magnetic material in rotor cavities, wherein at least a portion of the magnetic elements each have in their radially inner halves projections protruding on both sides to introduce centrifugal forces of the magnetic elements into the rotor, wherein further projections protruding on both sides are formed in radially outer halves of at least a portion of the magnetic elements, the magnetic elements having a length/width ratio of more than 3:1, wherein a maximum extension (C) of each of the further projections normal relative to a direction of extension of the magnetic elements is less than 50% of a width (D) of the magnetic elements.

26. The rotor according to claim 25, wherein the magnetic elements of a magnetic layer have end faces and are disposed in the magnetic layer such that opposing end faces of adjacent magnetic elements form bridges between the opposing end faces.

27. The rotor according to claim 26, wherein the opposing end faces are essentially flat and parallel to each other at least in a section of 50%, so that the bridges have an approximately constant cross section over an extension (G) that is at least half of a total length (H).

28. The rotor according to claim 27, wherein a width of a bridge along the extension (G) changes by no more than 20%.

29. The rotor according to claim 26, wherein the projections are arranged at radially inner ends of the magnetic elements and their respective rear sides form and broaden radially inner end faces of respective magnetic elements.

30. A synchronous drive motor comprising the rotor according to claim 25.

31. A motor vehicle comprising the synchronous drive motor according to claim 30.

* * * * *